United States Patent [19]

Stephenson

[11] Patent Number: 5,172,145
[45] Date of Patent: Dec. 15, 1992

[54] BIDIRECTIONAL, CASSETTE-LOADED CHANGER MECHANISM FOR OVERHEAD TRANSPARENCIES

[75] Inventor: Stanley Stephenson, Rochester, N.Y.

[73] Assignee: Eastman Kodak Company, Rochester, N.Y.

[21] Appl. No.: 631,687

[22] Filed: Dec. 21, 1990

[51] Int. Cl.$^5$ ............................................. G03B 23/02
[52] U.S. Cl. ..................................... 353/103; 353/25; 353/DIG. 1; 353/DIG. 5
[58] Field of Search ............... 353/103, 113, 116, 114, 353/DIG. 1, 25, 122, DIG. 5, 118, 112, 27 A

[56] References Cited

U.S. PATENT DOCUMENTS

| | | | |
|---|---|---|---|
| Re. 27,976 | 4/1974 | Sahley | 355/64 |
| 3,110,217 | 11/1963 | Millner et al. | |
| 3,352,202 | 11/1967 | Woodrow | |
| 3,528,735 | 9/1970 | Bluitt et al. | 353/27 A |
| 3,594,082 | 7/1971 | Lonchar | 353/113 |
| 3,805,970 | 4/1974 | Eash | 353/116 |
| 4,018,521 | 4/1977 | Mischenko | 353/DIG. 1 |
| 4,153,353 | 5/1979 | Gold | 353/114 |
| 4,264,158 | 4/1981 | Lindqvist | 353/DIG. 5 |
| 4,493,540 | 1/1985 | Burbank, III et al. | 353/122 |
| 4,557,595 | 12/1985 | Freundt | 353/104 |
| 4,601,558 | 7/1986 | Hofmann et al. | 353/114 |
| 4,693,373 | 9/1987 | Lamb et al. | 353/113 |
| 4,756,616 | 7/1988 | Min et al. | 353/113 |
| 5,059,020 | 10/1991 | Géniėis | 353/122 |

FOREIGN PATENT DOCUMENTS 0259633  10/1990  Japan .................................... 353/103

OTHER PUBLICATIONS

Hoppmann Corporation Selectagraph Automatic Overhead Transparency Changer Sales Literature, Rev. 6 85 (3 pages).
Bergen Expo Systems, Inc., Auto-Graph Arc Overhead Projector with Automatic Transparency Changer/Model No. AGOH-2 Sales Literature (1 page).

*Primary Examiner*—William A. Cuchlinski, Jr.
*Assistant Examiner*—William C. Dowling
*Attorney, Agent, or Firm*—Marianne J. Twait

[57] ABSTRACT

A transparency changer attachment for an overhead projector includes hinged horizontal and vertical portions that are located over the projector cover glass and down the projector side, respectively. Transparencies are automatically sequentially fed by pick and retard rollers from a single cassette-loaded transparency stack in the vertical portion to belts and rollers located marginally of a viewing area defined in the horizontal portion, to bring them into registration with the cover glass for projection, and then return them to the single stack. A microprocessor circuit controls the stack side from which the next transparency is picked and to which it is returned, according to selection made by the user. The cassette is keyed to assure correct transparency orientation at loading. A sensor reads individual transparency identifying information to initiate rapid cycling to a particular next desired transparency.

19 Claims, 4 Drawing Sheets

BIDIRECTIONAL, CASSETTE-LOADED CHANGER MECHANISM FOR OVERHEAD TRANSPARENCIES

TECHNICAL FIELD

This invention relates in general to apparatus for the automatic sequential display of transparencies by an overhead projector; and, in particular, to a mechanism for allowing a stack of transparencies loaded in a cassette to be displayed and then returned to the cassette in a continuous sequence, in either a forward or backward direction.

BACKGROUND ART

A popular method of displaying information is by the use of overhead transparencies. Clear plastic sheets are imprinted with information from a variety of sources, such as photocopies, desktop plotters, and hand-drawn images using ink pens. These images are then placed on an overhead projector for display. The overhead projector passes high-intensity light through the transparent images, through a set of optics and onto a screen.

An overhead projector commonly includes a light box having a horizontal cover glass, and a lens and mirror arrangement positioned above the cover glass for projecting onto a remote viewing screen the image of a transparency positioned on the cover glass and illuminated by a light source located within the box. Usually, the changing from one transparency to the next is performed manually, with each transparency being manually placed in turn onto the light box cover glass for viewing, and then manually removed after viewing. Such procedure is not only tedious and tiresome, but makes it difficult to maintain the transparencies in proper order, particularly if some of the transparencies will be shown multiple times during the same presentation. Moreover, in order to have correct image orientation during viewing, each transparency must be correspondingly correctly oriented on the viewing plate. This makes handling even more cumbersome, especially if the room is darkened to enhance image contrast.

Accordingly, attempts have been made to construct power-operated changers for automatically feeding a stack of transparencies, one at a time, successively onto the cover glass of an overhead projector. Examples of such changers are disclosed in U.S. Pat. Nos. 3,110,217; 3,352,202; 3,594,082; and 4,756,616 (the disclosures of which are incorporated herein by reference thereto). In such prior art changer mechanisms, the transparencies to be viewed are stacked in a supply bin located on one side of a projector. They are automatically successively transported, one transparency at a time, to a viewing station in registration with the projector cover glass and then, following projection, are delivered to a receiving bin.

The conventional changers are complex and bulky. Supply and receiving bins are normally separate elements, awkwardly arranged to stick out in generally horizontal projection, often from opposite sides of the projector. Transparencies are stacked in horizontal orientation, parallel with the plane of the cover glass. And, even when bidirectional provision is made so that feeding of transparencies can occur both from the supply bin to the receiving bin and vice versa, the next transparency is always selected from or returned to the same side (top or bottom) of the stack in any one bin.

DISCLOSURE OF THE INVENTION

It is an object of the present invention to provide a changer mechanism for the automatic sequential display of a stack of transparencies by an overhead projector, which mechanism is simple and economic in construction and occupies a minimum of space.

It is another object of the invention to provide an overhead transparency changer that employs a single bin for the automatic sequential supply of a stack of transparencies to and retrieval from a viewing station of an overhead projector, and provides a bidirectional capability by enabling the supply or retrieval to occur selectively from either side of the stack.

It is a further object of the invention to provide a bidirectional transparency changer for an overhead projector, wherein a stack of transparencies is loaded by cassette into a single supply and retrieval bin.

It is yet a further object of the invention to provide a single bin, bidirectional overhead transparency changer having means for cycling through a stack of transparencies to automatically locate and display a particular next desired transparency.

In accordance with the invention, apparatus for the automatic sequential display of transparencies by an overhead projector includes means for holding a stack of transparencies in generally vertical orientation adjacent one side of an overhead projector, and means for automatically transporting the transparencies in succession to and from a viewing station aligned with the cover glass of the projector.

In a preferred implementation, discussed in further detail below, the apparatus takes the form of an attachment for use with a conventional overhead projector, and includes a horizontal housing portion which is laid over the projector cover glass and a vertical housing portion which depends from a side of the horizontal portion in abutment with a side of the projector. The horizontal portion comprises a frame-like structure for supporting a transparency during viewing. The vertical portion includes cassette means for loading the stack of transparencies. Means is provided for transporting transparencies between the vertical and horizontal portions, including means for selectively supplying and retrieving a next transparency to or from either the front or back of the cassette-loaded stack. Means is also provided for identifying individual members of the stack, and for automatically cycling through the stack to select a particular transparency for viewing.

The cassette is labeled and keyed to ensure at loading that the transparencies will be correctly oriented for display. The changer transport means has front and rear picking rollers to enable a single transparency to be pulled from either the front or rear of the stack, and a retarding roller which cooperates with the pick rollers to prevent the feeding of multiple transparencies and to direct the side of the stack to which a transparency is returned. Transportation of transparencies in either a forward or backward sequence is controlled by an electronic circuit based on local or remote user input.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

MODE OF CARRYING OUT THE INVENTION

Figure 1:
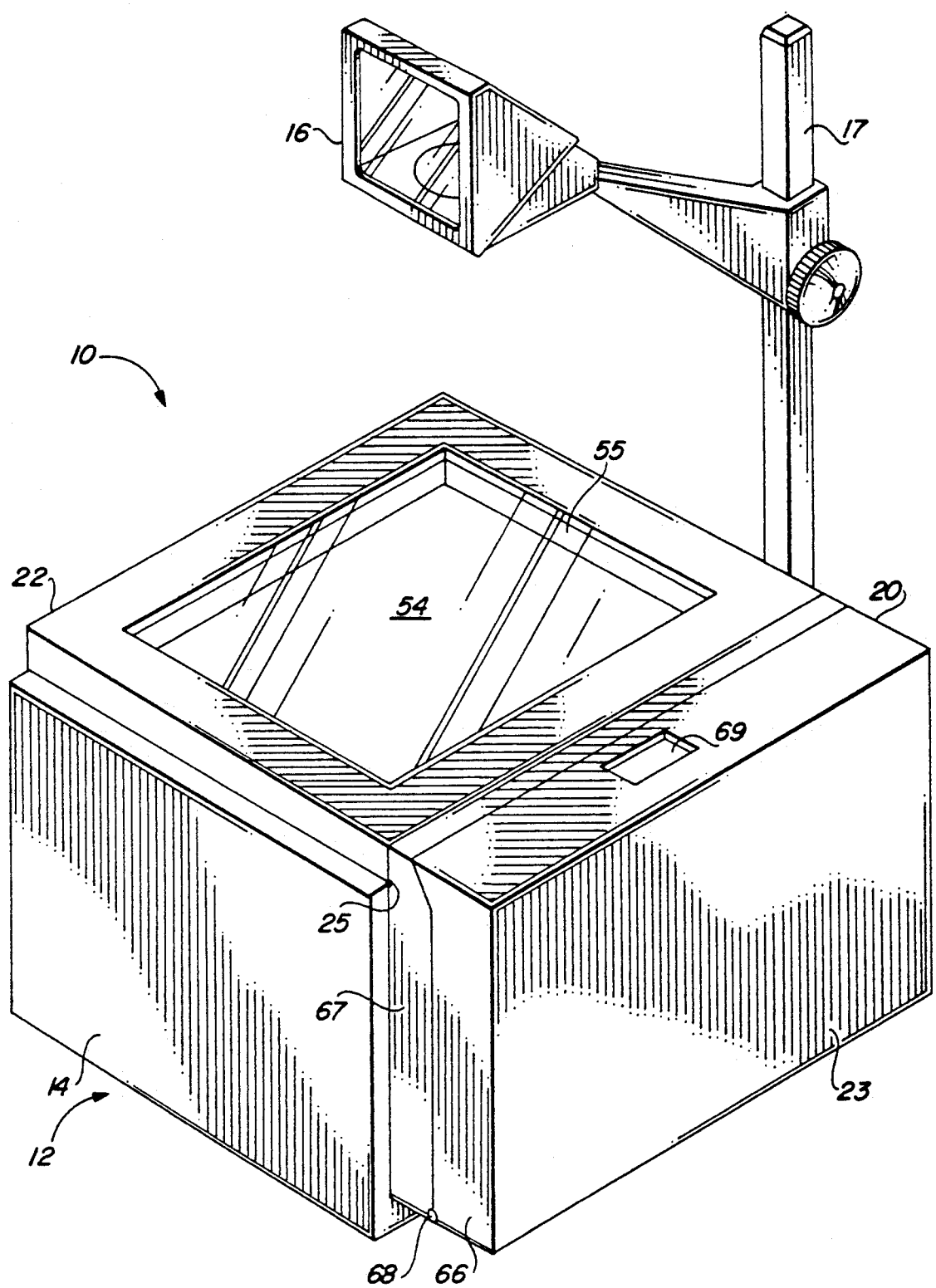
FIG. 1 is a perspective view of an overhead projector provided with a changer attachment in accordance with the invention.

The principles of the invention are described with reference to an exemplary implementation of a changer attachment 10 for a conventional overhead projector 12 (FIGS. 1 and 2 to provide a capability for automatic sequential display of a plurality of overhead transparencies.

The projector 12 includes in customary manner a light box 14 having a horizontal cover glass 15 and a lens and mirror arrangement 16 slidably mounted on a post 17 positioned above the cover glass 15 for projecting the image of a transparency located over the cover glass 15 and illuminated from underneath by a light source 18. A fresnel lens may be incorporated in the cover glass 15 in known way to provide uniformity of lighting. As used herein, the term "cover glass" refers to the area of the projector 12 which serves as the viewing station with which a transparency is aligned for backlighting by the light source 18 and projection by the lens and mirror arrangement 16.

In accordance with the invention, the changer 10 includes a housing 20 which has a generally rectangular planar horizontal portion 22 from one side of which depends a generally rectangular planar vertical portion 23. The changer 10 is placed over the projector 12, with the portion 22 above the cover glass 15 and the portion 23 extending downwardly along one side of the box 14. The portions 22, 23 may be hinged at hinge 25, as shown, to permit the portions 22, 23 to be brought into parallel abutment for storage purposes, when the unit 10 is removed from the projector 12.

Figure 4:
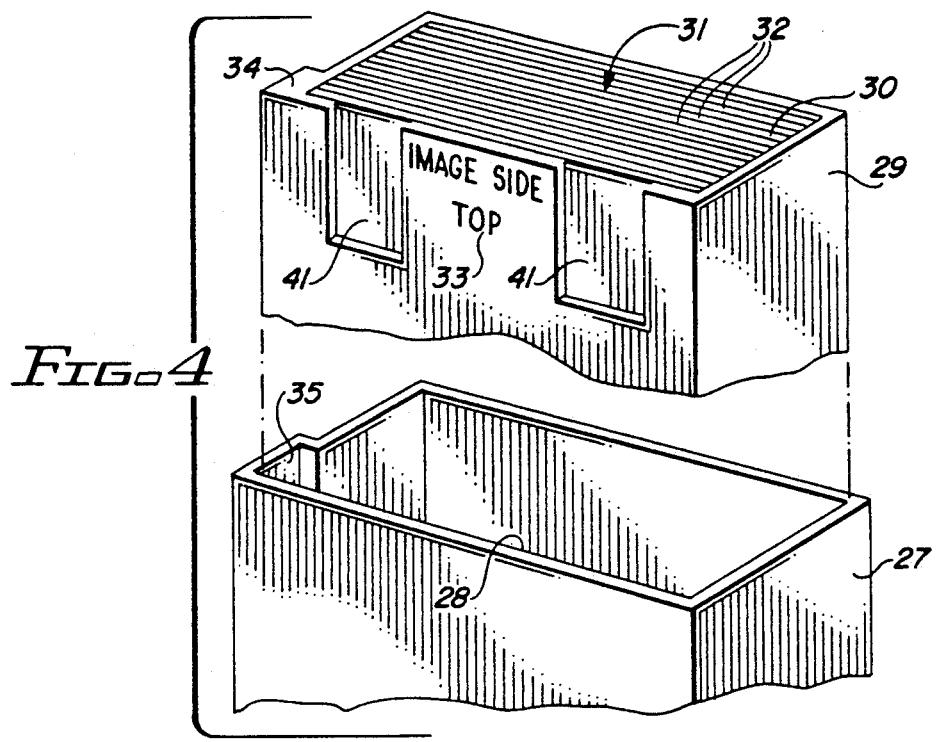
FIG. 4 is a fragmentary perspective view of the cassette loading elements.

The housing 20 contains a single bin 27 (FIG. 2) and recirculating transport means for the automatic sequential supply of transparencies from the bin 27 into registration with the viewing station 15 and retrieval of the same back to the bin 27. The bin 27 (FIGS. 2 and 4) provides a generally rectangular, open-topped cavity 28 into which a complementary-shaped cassette 29 may be loaded. The cassette 29 likewise includes a generally rectangular, open-topped cavity 30 into which a stack 31 of a plurality of overhead projection transparencies 32 can be inserted. The bin 27 is housed within the changer portion 23 so that when the cassette 29 is received within the cavity 28 of the bin 27, the transparency stack 31 is brought into adjacent vertical alignment with the side of the projector light box 14. As shown in FIG. 4, the cassette 29 may be labeled with indicia 33 and provided with a keying element 34 that matches a complementary element 35 of bin 27, to ensure that transparencies loaded in the cassette 29 according to the indicia 33 will be correctly oriented when the cassette 29 is mated with the bin 27, so that the transparencies will be correspondingly correctly oriented for display when they are delivered by the transport means to the viewing station 15.

The transport system comprises parts located in the portion 23 and parts located in the portion 22. Those in the portion 23 act to pick a transparency 32 from the front or rear of the stack 31, and return it to the front or rear of the stack 31, as described more fully below. Those in the portion 22 act to receive the selected next transparency 32 from the parts in the portion 23 and bring it into registration over the cover glass 15 and, thereafter, return the transparency back to the parts in portion 23.

Figure 2:
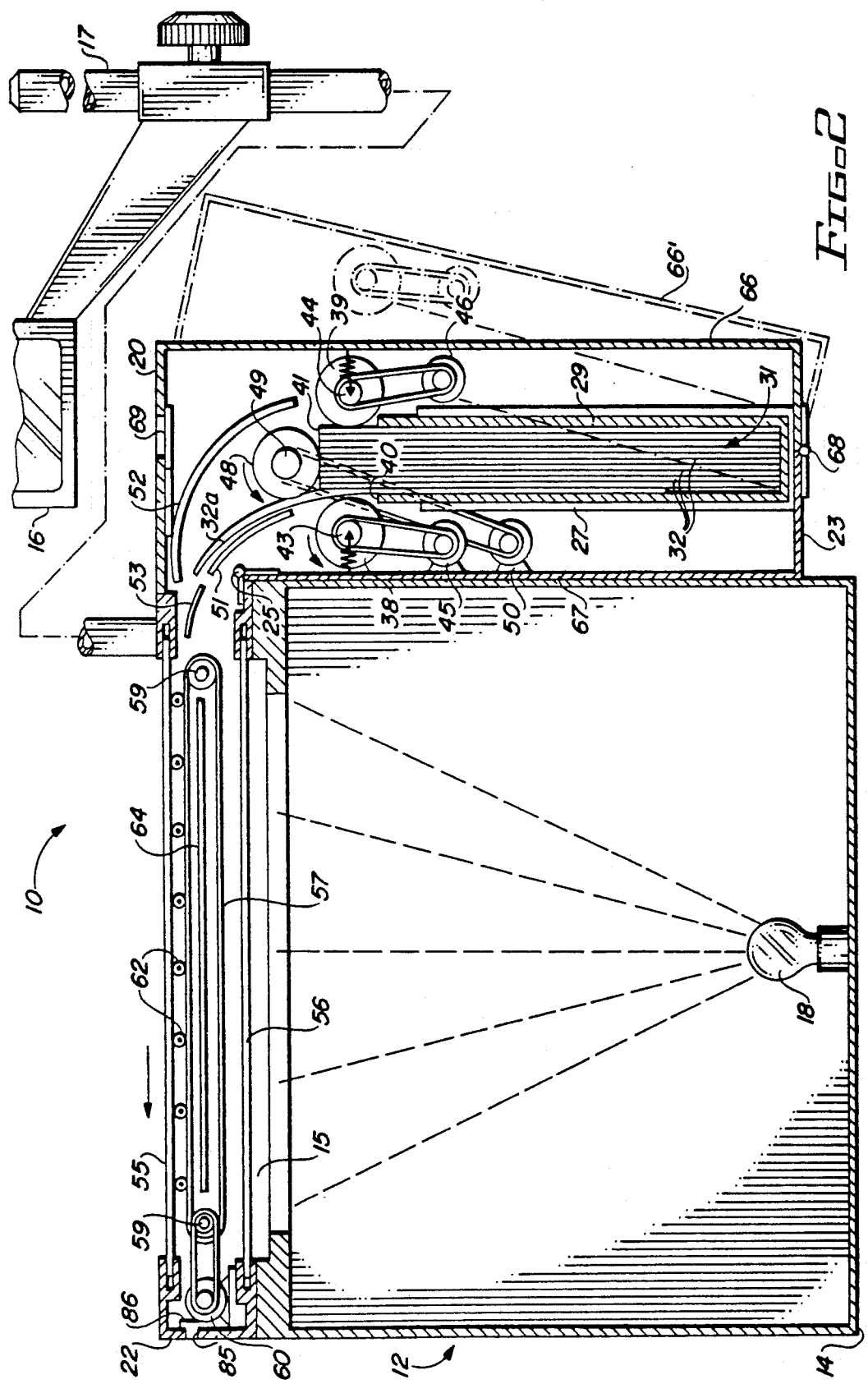
FIG. 2 is a side section view of the same.
Figure 3:
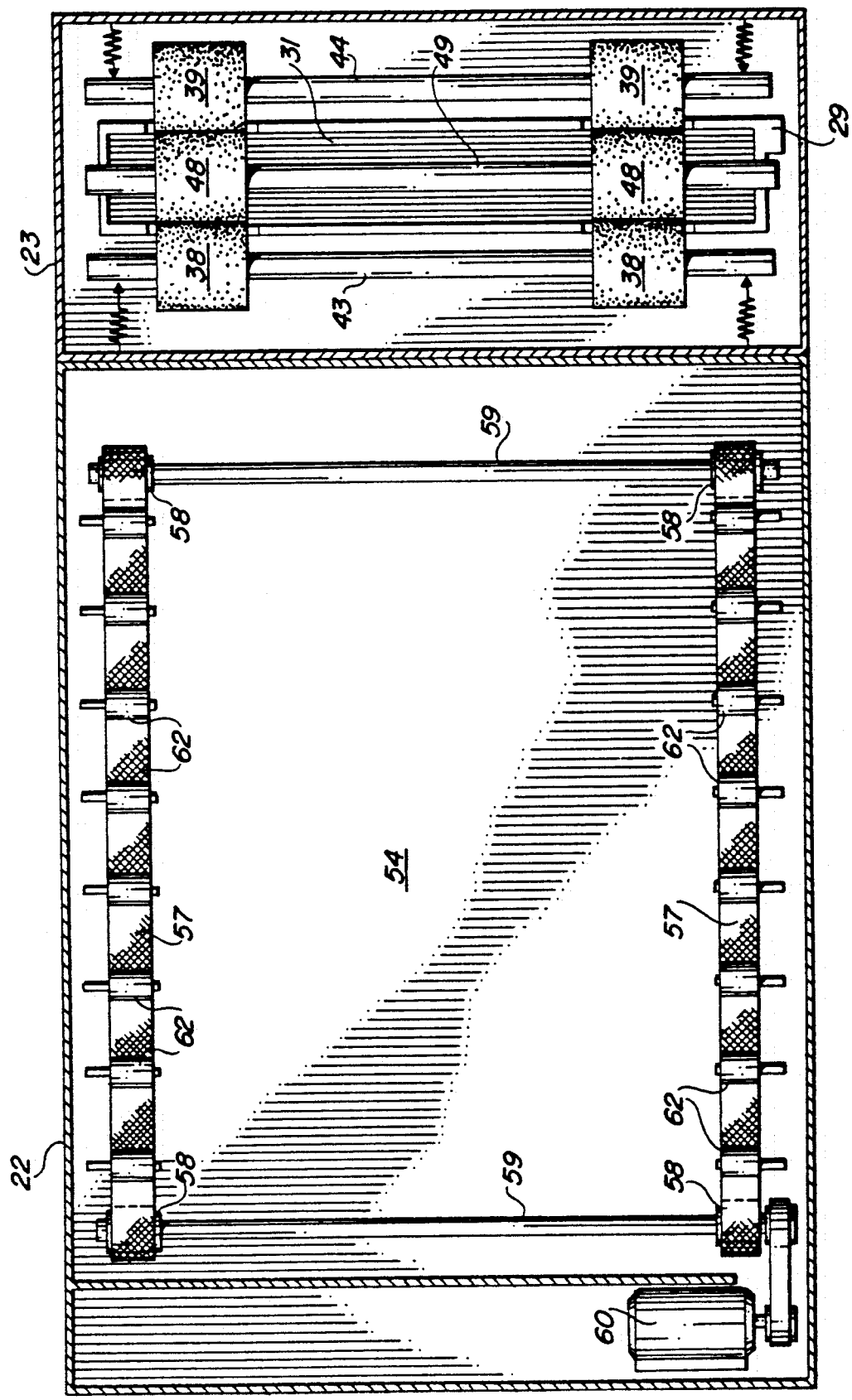
FIG. 3 is a top view of the roller transport means.

As shown in FIGS. 2 and 3, the transparency transport means comprises two laterally-spaced sets of picker rollers 38, 39 that are spring-loaded to extend through front and rear apertures 40, 41 (FIGS. 2 and 4) of the exposed top of the loaded cassette 29 to contact front and rear sides, respectively, of the loaded transparency stack 31. The spring-loading is achieved using known biasing mechanisms to exert a near-constant load to the pick rollers 38, 39, despite variations in the number of transparencies 32 in the stack 31. The rollers 38, 39 are disposed at even elevations for rotation on laterally-spaced shafts 43, 44 (FIG. 3). The shafts 43, 44 are suitably journalled for rotation within housing portion 23 and extend longitudinally in generally horizontal positions running parallel to the neighboring side of the projector 14. Bidirectional electric motors 45, 46 are fixed within housing portion 23 connected to drive the shafts 43, 44, respectively.

A third set of rollers 48 is disposed above the top of the loaded transparency cassette 29. The rollers 48 are mounted for rotation on a shaft 49, located to position the rollers 48 above and between the rollers 38, 39. Shaft 49 is suitably journalled for rotation within housing portion 23, between and parallel to the shafts 43, 44. A bidirectional electric motor 50 is fixed within portion 23 and connected to drive the shaft 49. The rollers 48 act as retard rollers to prevent the pick-up of multiple transparencies by the pick rollers 38, 39 by rotating counter to the transparency flow during pick-up. The rollers 48 also act during return of a transparency 32 from the viewing station to determine to which side of the stack 31 it will be directed.

Guide rails 51, 52 (see FIG. 2) are positioned on either side of the rollers 48, with lower ends adjacent the nips between rollers 48 and the rollers 38, 39. The rails 51, 52 assume a rounded contour, configured to guide the transparencies 31 after pick-up from and during return to the cassette 29. The upper ends of the rails 51, 52 are located in alignment with transparency receiving elements of an open input side of the horizontal housing portion 22. The rails 51, 52 (and corresponding extensions 53 thereof located in portion 22) serve to provide a smooth crossover for the transparencies 32 as they pass between the parts of the transport means respectively located in portions 22, 23.

As already indicated, the housing portion 22 has a generally rectangular planar configuration designed to overlay and surround the illuminated area 15 of the projector 12. Portion 22 defines a transport and registration assembly and includes a viewing area, generally indicated by reference numeral 54 in FIG. 3, that is left unobstructed for framing a transparency 31 in registration with the projector cover glass 15 for projection. Top and bottom sections of the horizontal housing portion 22 above and below the viewing area are either left open or made transparent by means such as glass plates 55, 56, shown in FIG. 2.

Driving means, which may take the form of pair of endless belts 57 located marginally in the portion 22 on opposite sides of the viewing area 54, serves to transport a transparency 32 received from the portion 23 and to support the same after bringing it into registration with the viewing area 54. The belts 57, as viewed in FIG. 3, extend generally at right angles to the axes of the shafts 43, 44, 49. Opposite ends of the belt runs are wound around driving wheels or sprockets 58 which are mounted for rotation on shafts 59. Shafts 59 are suitably journalled within the portion 22, so that they extend longitudinally parallel to the shafts 43, 44, 49 and marginally of the viewing area 54. A bidirectional electric motor 60 is fixed within portion 22 clear of the viewing area 54 and connected to the nearest shaft 59 to drive the belts 57. Sets of rollers 62 are located above the belts 57 to exert downward force on the belts 57 so that the transparencies 31 are adequately supported when transported by the belts 57. The rollers 62 are suitably journalled marginally of the area 54 to permit their free rotation in cooperation with the belts 57. A glass plate 64 located parallel to the cover glass 15, with its top surface proximate the level of the upper runs of the belts 57, serves to ensure that a transparency supported between the belts 57 and rollers 62 and registered with the viewing area 54, will lie flat. The changer 10 is configured so that the plate 64 will be located above the cover plate 15 by a distance that is small enough so that a transparency 32 supported on the glass 64 will still be within the range of a typical projector's focus field. A cooling fan (not shown) can be incorporated within the frame housing 22 in accordance with known techniques, if desired, to remove heat absorbed by the glass.

For purposes of loading the cassette 29 into the bin 27, the vertical housing portion 23 is made separable, with a rear portion 66 movable relative to a front portion 67 about a hinge 68 from a "closed" position (shown in solid lines in FIG. 2) to an "open" position 66' (shown in dot-dash lines in FIG. 2). Attachments of the roller sets 38, 39, 48, the motors 45, 46, 50, the guide rails 51, 52, and the bin 27 are determined so that clear access for loading the cassette 29 into and out of the cavity 28 of the bin 27 is available when the rear portion 66 is brought into its "open" position 66'. Releasable latch means 69 is provided to releasably secure the portions 66 in its "closed" position.

Figure 5:
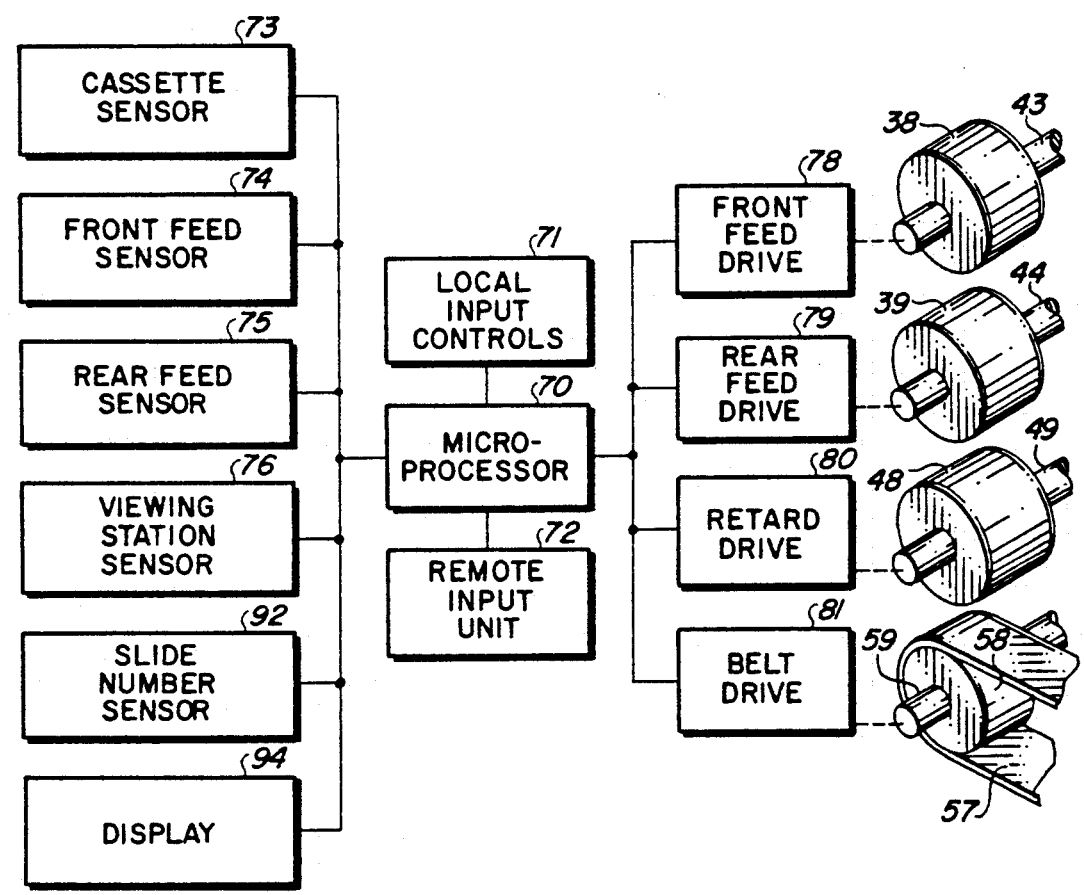
FIG. 5 is a block diagram of the electronic circuit.

FIG. 5 is a block diagram of an electronic circuit for the control of the apparatus 10.

The control functions are supervised by a microprocessor 70 in accordance with inputs received from local or remote input elements 71, 72 and from various sensors suitably located throughout the system that monitor the status of system parameters and the progress of a transparency as it is transported. A cassette sensor 73 is located to determine the presence and proper positioning of cassette 29 in the bin 27, and whether or not transparencies are loaded in the cassette 29. A front feed sensor 74 is located to provide input for status monitoring and feedback purposes regarding the functioning of the front feed rollers 38 and accomplishment of a front feed pick or return. A rear feed sensor 75 is located to serve the same purpose relative to rear feed rollers 39 and a rear feed pick or return. A viewing station sensor 76 is located to monitor the status and functioning of the portion of the transport system located proximate the viewing area 54. Microprocessor 70 is connected to act in response to inputs received from the units 71, 72 and sensors 73-76 to control drivers 78, 79, 80, 81 to drive the bidirectional motors 45, 46, 50, 60, respectively.

In operation, microprocessor 70 responds to electrical commands from control panel 71 or remote control 72 to operate the changer 10 to sequence transparencies 32 loaded in cassette 29 either in the forward (front pick/rear return) or backward (rear pick/front return) direction. For sequencing in the forward direction, the rollers 38 urged against stack 31 through apertures 40 are rotated under control of driver 78 in the counterclockwise direction, as indicated in FIG. 2. This action moves a next front transparency 32a up and out of the cassette 29 toward the converging upper ends of the guide rails 51, 52 and into the framing unit 22. At the same time, the retard rollers 48 are rotated under control of driver 80 in the counterclockwise direction indicated in FIG. 2, against the flow of movement of the driven transparency 32a. This assures that only that transparency immediately driven by the rollers 38 will be transported out of the cassette 29. The movement of rollers 48 against the flow prevents transparencies 32 located rearward of transparency 32a from being lifted out. The transportation elements of the different portions 22, 23 are relatively located so that at least the leading edge of transparency 32a is guided between rollers 62 and belts 57 before the trailing edge is released from the driving action of the rollers 38.

Belts 57 are rotated under control of driver 81, so they move in the counterclockwise direction indicated in FIG. 2 to transport the transparency 32a across viewing area 54 until sensor 76 detects that proper registration for viewing has been achieved. When this occurs, microprocessor 70 will direct the driver 81 to stop the belts 57, so that the transparency 32a can be held still over the cover glass 15 for projection by the lens and mirror arrangement 16. After projection, the driver 81 controls the motor 60 to move the belts in the opposite direction to transport the transparency 32a back between the rails 51, 52 and toward the cassette 29. The time between reversals of the motor 60 can be either manually controlled or automatically controlled in response to presetting of a lag time by the user either through input at the local console 71 or at the remote control 72.

Upon return of transparency 32a from the framing unit 22 to the bin unit 23, the retard rollers 48 are driven under control of driver 80 in a direction to control whether the transparency 32a is returned to the front or rear of the stack 31 in the cassette 29. For normal forward direction sequencing, rollers 48 are driven clockwise (as viewed in FIG. 2) to direct the returning transparency 32a into the nip between the rollers 39 and 48. Rollers 39 are turned in the counterclockwise direction to drive the transparency into a rearmost position in the cassette 29.

For reverse direction sequencing, transparencies will be picked from the rear of the stack 31 and returned to the front. The rear pick operation will occur similarly to the front pick operation, described above, except that rollers 39 will be motivated to move in a clockwise direction and retard rollers 48 will be moved in a clockwise direction. During a front side return, rollers 48 will be rotated in the counterclockwise direction and rollers 38 will be rotated in the clockwise direction. The operation of belts 57 will be as before. The direction of operation can be reversed any time by the user by activating switches at the local 71 or remote unit 72. In this manner, front or rear pick and front or rear return can be selected at will.

The pick characteristics are controlled by the relative spacing and compositions of the rollers 38, 39, 48. The pick rollers 38, 39 may, for example, be 1.20" diameter rollers having an outer surface of microcellular urethane ENDUR-C formulation C-400 (commercially available from Rogers Corporation, South Windham, Conn.), with a coefficient of friction of 2.1 and a Shore A durometer hardness of 4. The retard rollers 48 may be 0.300" diameter rollers having an outer surface of ENDUR-C formulation C-300, with a coefficient of friction of 1.4 and a Shore A durometer hardness of 18. The pick rollers 38, 39 may be urged against the stack 31 with a force of 4 to 8 pounds.

For the purpose of providing a capability to manually supply or retrieve a transparency 32 from the changer 10, a manual feed/retrieve slot 85 may be provided at a convenient location in the changer 10 (see FIG. 2). The slot 85 may be located in line with plate 64, in the end of portion 22 furthest from the portion 23, as shown. The belts 57 can be controlled to bring transparencies into or out of the changer 10 through slot 85. This feature allows a user to edit a sequence of overheads in the changer 10, or to integrate manual with automatic feeding in other ways, as desired. A line of conductive fiber brushes 86 can be located adjacent slot 85, or at another suitable place, to enable a sheet 32 going into the changer 10 to be cleaned and static removed therefrom as it is passed by. Static can, optionally, further be controlled by making the rollers of a conductive material and grounding the frame. The transparencies can also be coated in known ways.

In order to provide a capability for locating and displaying a particular next desired transparency, means such as a slide number sensor 92 (FIG. 5) can be provided adjacent the cassette 29 or elsewhere along the transparency movement path to read identification information encoded on the transparencies 31. For example, sensor 92 may take the form of an electro-optical sensor and each transparency 32 can be encoded at a like location with a bar code, or similar code capable of being optically sensed. Then, as transparencies 32 are brought up onto the viewing area 54, each transparency can be identified by sensor 92, and its identification displayed on a display 94 located on the local console 71, the remote unit 72, or both. In this way, the sequential transportation of the transparencies 32 can be coordinated with a predetermined desired order of presentation. If the sensed identification of the next available transparency 32 does not correspond to the identification of the next desired transparency 32, rapid cycling either forward or backward through the sequence can be initiated until the transparency 32 whose identification matches that of the desired transparency 32 is brought into registration with the viewing area 54. For input units 71, 72 configured with an alphanumeric keypad or other similar numerical input device, the user can program the microprocessor 70 to automatically cycle the transparencies for presentation according to a requested presentation sequence.

Those skilled in the art to which the invention relates will appreciate that various other substitutions and modifications can be made to the described embodiment without departing from the spirit and scope of the invention as described by the claims below.

What is claimed is:

1. A changer mechanism attachment for the automatic sequential display of a stack of transparencies by an overhead projector; the projector having a light box with a light source, sides, a top and a cover glass located at the top, and optics positioned relative to the cover glass for projecting onto a remote viewing screen the image of a transparency brought into registration with the cover glass and illuminated by the light source, the changer mechanism comprising:
    a housing having a planar horizontal portion dimensioned, configured and adapted to be placed over the cover glass on the projector light box top, and a planar vertical portion dimensioned, configured and adapted to extend from the horizontal portion, downwardly adjacent one of the projector light box ends;
    a bin, located in the housing vertical portion, for receiving the stack of transparencies; and
    transportation means for automatically feeding the transparencies, one at a time, sequentially from the stack loaded in the bin, into registration with the cover glass, and then back to the stack.

2. A changer mechanism as in claim 1, wherein the housing further comprises hinge means joining the horizontal and vertical portions for enabling the portions to be brought into parallel abutment for storage purposes when the changer mechanism is not in use on the projector.

3. A changer mechanism as in claim 1, wherein the stack has front and rear sides, and wherein the transportation means comprises means, located in the vertical portion, for sequentially picking the transparencies one at a time from the front side of the loaded stack and for returning the picked transparencies to the rear side of the loaded stack; and means, located in the horizontal portion, for sequentially receiving the picked transparencies from the means for picking and returning, for bringing the received transparencies into registration over the cover glass for projection, and for then returning the transparencies after registration for projection back to the means for picking and returning.

4. A changer mechanism attachment for the automatic sequential display of a plurality of transparencies by an overhead projector having a light box with a light source and a cover glass, and optics positioned relative to the cover glass for projecting onto a remote viewing screen the image of a transparency brought into registration with the cover glass and illuminated by the light source, the changer mechanism comprising:
    a bin dimensioned, configured and adapted for receiving the plurality of transparencies loaded in a stack in the bin, the stack having front and rear sides; and
    transportation means for automatically feeding the transparencies one at a time sequentially from the stack into registration with the cover glass and then back to the bin; the transportation means comprising a first roller positioned to be adjacent to the loaded stack front side; a second roller laterally-spaced from the first roller and positioned to be adjacent to the loaded stack rear side; means for biasing the first and second rollers respectively against the loaded stack front and rear sides; and means for selectively driving the first or second roller in a pick-up rotational direction to pick up a transparency from the corresponding adjacent loaded stack front or rear side.

5. A changer mechanism as in claim 4, wherein the stack has a top, and the transportation means further comprises a third roller located between the first and second rollers and positioned to be adjacent the loaded stack top; and means for selectively driving the third roller in the pick-up rotational direction of the selectively driven first or second roller, the rollers being relatively dimensioned, configured and adapted so that the picked transparency moves between the first and third or second and third rollers, and so that the third roller is rotated counter to the movement of the picked transparency during pick-up by the corresponding first or second roller.

6. A changer mechanism as in claim 5, wherein the transportation means further comprises means for selecting between a front side return mode and a rear side return mode for return of the picked transparency to the loaded stack; means for driving the first roller in a direction opposite to the first roller pick-up rotational direction and for driving the third roller in the first roller pick-up rotational direction, when the front side return mode is selected; and means for driving the second roller in a direction opposite to the second roller pick-up rotational direction and for driving the third roller in the second roller pick-up rotational direction, when the rear side return mode is selected.

7. A changer mechanism as in claim 5, wherein the changer further comprises a housing including a viewing area left unobstructed the viewing area being dimensioned, configured and adapted for positioning in registration with the projector cover glass; and wherein the transportation means further comprises means for receiving the picked transparency after pick up, and for framing it in alignment with the viewing area for projection by the projector.

8. A changer mechanism as in claim 7, wherein the viewing area includes opposite sides; and wherein the means for receiving and framing comprises a pair of endless belts located marginally of the viewing area, respectively adjacent the opposite sides; means, located above the belts, for exerting a downward force on the belts to support the picked transparency on the belts; and means for driving the belts.

9. A changer mechanism as in claim 8, wherein the means for receiving and framing further comprises a transparent plate located between the belts in the viewing area and dimensioned, configured and adapted for ensuring that the picked transparency lies flat when supported on the belt.

10. A changer mechanism attachment for the automatic sequential display of a plurality of transparencies by an overhead projector; the projector having a light box with a light source and a cover glass, and optics positioned relative to the cover glass for projecting onto a remote viewing screen the image of a transparency brought into registration with the cover glass and illuminated by the light source; and the changer mechanism having a bin, and transportation means for automatically feeding the transparencies, one at a time, sequentially from the bin into registration with the cover glass and then back to the bin; characterized in that:
the bin is dimensioned, configured and adapted for receiving the plurality of transparencies loaded in a stack in the bin, the stack having front and rear sides;
the changer includes means for cycling the transparencies in a forward direction through the stack, by sequentially picking the transparencies one at a time from the front side of the stack, moving them into registration with the cover glass and then returning them to the rear side of the stack; the means for cycling the transparencies in a forward direction comprising movable members defining a path for transport of the transparencies, means for driving the movable members to move transparencies along the path, circuitry including a microprocessor for controlling the means for driving, and sensor means, connected to the microprocessor, for monitoring the movement of transparencies transported along the path.

11. A changer mechanism attachment for the automatic sequential display of a plurality of transparencies by an overhead projector; the projector having a light box with a light source and a cover glass, and optics positioned relative to the cover glass for projecting onto a remote viewing screen the image of a transparency brought into registration with the cover glass and illuminated by the light source; and the changer mechanism having a bin, and transportation means for automatically feeding the transparencies, one at a time, sequentially from the bin into registration with the cover glass and then back to the bin; characterized in that:
the bin is dimensioned, configured and adapted for receiving the plurality of transparencies loaded in a stack in the bin, the stack having front and rear sides; and
the changer includes means for cycling the transparencies in a forward direction through the stack, by sequentially picking the transparencies one at a time from the front side of the stack, moving them into registration with the cover glass and then returning them to the rear side of the stack; and further includes means for locating and displaying a particular next desired transparency from the stack.

12. A changer mechanism as in claim 11, for the display of a plurality of transparencies including individual slide identifying information thereon, wherein the means for locating and displaying comprises a microprocessor connected for controlling the means for cycling the transparencies in a forward direction; and a slide identification sensor connected to the microprocessor and dimensioned, configured and adapted for sensing the slide identifying information from the transparencies.

13. In combination with an overhead projector having a light box with a light source and a cover glass, and optics positioned relative to the cover glass for projecting onto a remote viewing screen the image of a transparency brought into registration with the cover glass and illuminated by the light source; a changer mechanism having a housing, a bin located in the housing for receiving a plurality of transparencies loaded in a stack in the bin, and transportation means for automatically feeding the transparencies, one at a time, sequentially from the stack loaded in the bin into registration with the cover glass; characterized in that:
the stack has front and rear sides;
the bin has a cavity;
the changer further comprises a cassette having an interior and an exterior; the cassette interior being dimensioned, configured and adapted for receiving the stack of transparencies therein, and the cassette exterior being dimensioned, configured and adapted for being received within the bin cavity; and
the means for feeding comprises means for cycling the transparencies in a forward direction through the stack by sequentially picking the transparencies one at a time from the front side of the cassette-loaded stack with the cassette loaded in the bin, moving the picked transparencies one at a time into registration with the cover glass, and then returning the registered transparencies one at a time to the rear side of the stack; means for cycling the transparencies backward through the stack by sequentially picking the transparencies one at a time from the rear side of the stack, moving the picked transparencies one at a time into registration with the cover glass, and then returning the registered transparencies one at a time to the front side of the stack; and means for selectively choosing between operation of the means for cycling in the forward direction and the means for cycling in the backward direction.

14. In combination with an overhead projector having a light box with a light source and a cover glass, and optics positioned relative to the cover glass for projecting onto a remote viewing screen the image of a transparency brought into registration with the cover glass and illuminated by the light source; a changer mechanism having a housing, a bin located in the housing for receiving a stack of transparencies, and transportation means for automatically feeding the transparencies, one at a time, sequentially from the stack loaded in the bin into registration with the cover glass; characterized in that:

the changer housing comprises a horizontal portion having an unobstructed viewing area in alignment with the cover glass and first and second edges, and a vertical portion connecting one edge of the horizontal portion; the bin is located in the vertical portion; and the means for feeding comprises means for feeding the transparencies sequentially from the stack loaded in the bin, one at a time from the vertical portion to the horizontal portion, into registration with the cover glass, and then back to the stack.

15. A combination as in claim 14, wherein the other edge of the horizontal portion includes an opening, and the changer further comprises means for optionally feeding transparencies to or from positions of registration with the cover glass, through the other edge opening.

16. A changer mechanism attachment for the automatic sequential display of a plurality of transparencies by an overhead projector; the projector having a light box with a light source and a cover glass, and optics positioned relative to the cover glass for projecting onto a remote viewing screen the image of a transparency brought into registration with the cover glass and illuminated by the light source; and the changer mechanism having a bin, and transportation means for automatically feeding the transparencies, one at a time, sequentially from the bin into registration with the cover glass and then back to the bin; characterized in that:

the bin is dimensioned, configured and adapted for receiving the plurality of transparencies loaded in a stack in the bin, the stack having front and rear sides; and the changer includes means for cycling the transparencies in a forward direction through the stack, by sequentially picking the transparencies one at a time from the front side of the stack, moving them into registration with the cover glass and then returning them to the rear side of the stack; means for cycling the transparencies in a backward direction through the stack, by sequentially picking the transparencies one at a time from the rear side of the stack, moving them into registration with the cover glass, and then returning them to the front side of the stack; and means for selectively choosing between operation of the means for cycling in the forward direction and the means for cycling in the backward direction.

17. A changer mechanism as in claim 16, wherein the bin has a cavity, and wherein the changer further comprises a cassette having an interior and an exterior, the cassette interior being dimensioned, configured and adapted for receiving the stack of transparencies therein, and the cassette exterior being dimensioned, configured and adapted for being received within the bin cavity.

18. A changer mechanism as in claim 17, wherein the bin includes a first keying element associated with the bin cavity, and the cassette including a second keying element matchable with the first keying element when the cassette exterior is received within the bin cavity to ensure correct orientation of the cassette relative to the bin.

19. A changer mechanism as in claim 18, wherein the cassette includes indicia for providing a guide, so that transparencies loaded into the cassette interior in accordance with the indicia will be correspondingly correctly oriented for display when brought into registration with the cover glass, if the cassette is correctly oriented relative to the bin.

* * * * *